United States Patent Office 3,435,116
Patented Mar. 25, 1969

3,435,116
THE TREATMENT OF DIABETES MELLITUS
WITH BENZENESULFONYL UREAS
Helmut Weber, Frankfurt am Main, Walter Aumuller, Kelkheim, Taunus, Rudi Weyer, Frankfurt am Main, and Karl Muth, Kelkheim, Taunus, Germany, assignors to Farbwerke Hoechst Aktiengesellschaft vormals Meister Lucius & Bruning, Frankfurt am Main, Germany, a corporation of Germany
No Drawing. Original application Sept. 21, 1964, Ser. No. 398,106, now Patent No. 3,336,322, dated Aug. 15, 1967. Divided and this application Feb. 2, 1967, Ser. No. 643,747
Int. Cl. A61k 27/00
U.S. Cl. 424—267       2 Claims

ABSTRACT OF THE DISCLOSURE

A method has been provided for lowering blood sugar by administering to a host a sulfonyl urea of the formula

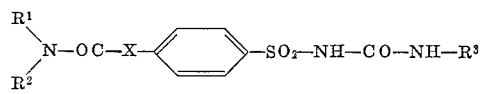

in which $R^1$ is a member selected from alkyl of 1 to 4 carbon atoms, cycloalkyl of up to 8 carbon atoms, alkyl substituted cycloalkyl of up to 8 carbon atoms, cyclohexylmethyl and cyclohexylethyl,
$R^2$ is hydrogen and alkyl of 1 to 4 carbon atoms,
$R^1$ and $R^2$ together with the nitrogen atom are linked to form a member selected from the group consisting of unsubstituted and methyl substituted heterocyclic nucleus of 4 to 6 carbon atoms in the heterocyclic ring,
X is a saturated hydrogen bridge of 1 to 2 carbon atoms or a vinyl bridge of 2 carbon atoms,
$R^3$ is a member selected from lower alkyl substituted cycloalkyl of 5 to 8 ring carbon atoms, cyclohexylmethyl, cyclohexylethyl and phenyl alkyl of 1 to 2 alkyl carbon atoms, and pharmaceutically acceptable basic salts thereof. A composition containing a dose of 0.1 to 1 gram of at least one of the above compounds per unit of the composition are administered to the host. The blood sugar lowering method is characterized in its effectiveness by a method such as Hagedorn-Jensen. An advantage accruing when employing the present method is the prolonged effect in lowering the blood sugar such as determined by the effectiveness of the method after 24 hours.

This application is a division of application Ser. No. 398,106 filed Sept. 21, 1964, now U.S. Patent 3,336,322.
The present invention relates to new benzenesulfonyl ureas and to a process for their manufacture.
It has been found that compounds of the general Formula I

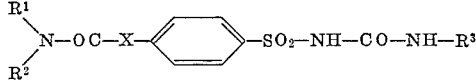

in which $R^1$ is alkyl of 1 to 4 carbon atoms, cycloalkyl of up to 8 carbon atoms, alkyl substituted cycloalkyl of up to 8 carbon atoms, cyclohexylmethyl or cyclohexylethyl,
$R^2$ is hydrogen or alkyl of 1 to 4-carbon atoms or
$R^1$ and $R^2$ together with the nitrogen atom linked thereto form a heterocyclic nucleus with 4 to 6 ring carbon atoms, X is a single chemical linkage or a hydrocarbon bridge of 1 to 2 carbon atoms, and
$R^3$ is saturated or unsaturated lower alkyl substituted cycloalkyl of 5 to 8 ring carbon atoms, cyclohexylmethyl, cyclohexylethyl or phenylalkyl of 1 to 2 alkyl carbon atoms, and their physiologically tolerable salts are valuable medicaments and are distinguished by the fact that they are capable of exerting a strong and particularly prolonged lowering effect on the blood sugar level.
The process for preparing the aforementioned benzenesulfonyl ureas is characterized by the fact that (a) $R^1R^2N$—CO—X - substituted benzenesulfonyl isocyanates, benzenesulfonyl carbamic acid esters, benzenesulfonyl thiocarbamic acid esters, benzenesulfonyl carbamic acid halides or benzenesulfonyl ureas are reacted with amines of the formula $R^3NH_2$ or the salts thereof,
(b) $R^3$-substituted isocyanates, carbamic acid esters, thiocarbamic acid esters, carbamic acid halides or ureas are reacted with $R^1R^2N$—CO—X-substituted benzenesulfonamides, advantageously in the form of their salts,
(c) $R^1R^2N$—CO—X - substituted benzenesulfonyl chloride are reacted with $R^3$-substituted ureas, isourea ethers, isothiourea ethers or parabanic acids, and the benzenesulfonyl isourea ethers, benzenesulfonyl isothiourea ethers or benzenesulfonyl parabanic acids obtained in such a way or according to any other method are hydrolyzed,
(d) the sulfur atom is replaced in correspondingly substituted benzenesulfonyl thioureas by an oxygen atom or
(e) correspondingly substituted benzenesulfonyl ureas, containing the grouping X=—CH=CH—, are hydrogenated, and for the salt formation, the obtained compounds are, if desired, treated with alkaline agents. Instead of $R^3$-substituted isocyanates, there may also be used as starting materials compounds which in the course of the reaction form such isocyanates or which react like such isocyanates. Instead of the aforementioned benzenesulfonyl isocyanates, there may also be used as starting materials compounds which in the course of the reaction form such benzenesulfonyl isocyanates or which react like such benzenesulfonyl isocyanates.
The $R^1R^2N$—CO—X-substituted benzenesulfonyl carbamic acid esters or benzenesulfonyl monothio-carbamic acid esters used as starting materials may contain a low molecular alkyl radical or a phenyl radical in the ester component. The same applies to $R^3$-substituted carbamic acid esters or to the corresponding monothio-carbamic acid esters. In any case, by low molecular alkyl radical an alkyl radical of up to 4 carbon atoms is to be understood.
As carbamic acid halides, chlorides are preferentially suitable.
The sulfonyl ureas used as starting material can be unsubstituted in the urea molecule opposite the sulfonyl group or mono or disubstituted by alkyl radicals, preferably by those of up to 4 carbon atoms or by aryl radicals such as phenyl, tolyl, ethylphenyl, halogenophenyl, biphenyl or naphthyl. Instead of benzenesulfonyl ureas substituted in such a way, there may also be used the corresponding N-benzenesulfonyl-N'-acyl ureas in which "acyl" represents, for example, formyl, acetyl, propionyl, butyryl or benzoyl, or bis-(benzenesulfonyl)-ureas. For example, these bis-(benzenesulfonyl)-ureas or N-benzenesulfonyl-N'-acyl ureas can be treated with amines of the formula $R^3NH_2$, and the obtained salts are then heated to elevated temperatures, advantageously to temperatures above 100° C.

Furthermore, it is possible to react ureas of the formula $R^3NH-CO-NH_2$ or acylated ureas of the formula $R^3NH-CO-NH-$ acyl, in which "acyl" represents preferably a low molecular aliphatic or aromatic acid radical such as formyl, acetyl, propionyl, butyryl or benzoyl, or the nitro group, or diphenyl ureas of the formula $$R^3NH-CO-N(C_6H_5)_2$$

in which the phenyl groups may be substituted or linked with each other either directly or by a bridge member such as $-CH_2-$, $-N-$, $-O-$ or $-S-$, or to react N,N'-disubstituted ureas of the formula $$R^3NH-CO-NHR^3$$

with $R^1R^2N-CO-X$-substituted benzenesulfonamides.

For the desulfurization of the correspondingly substituted benzenesulfonyl thioureas there can be used for example oxides or salts of heavy metals such as lead oxides, mercuric oxides or cupric oxides as well as salts of said metals, or oxidizing agents, such as hydrogen peroxide, sodium peroxide or nitrous acid.

With regard to the reaction conditions, the aforesaid process can be varied within wide limits and adapted to the prevailing circumstances. For example, the reactions can be carried out at room temperature or at an elevated temperature using solvents.

The afore-mentioned sulfonyl ureas containing the grouping wherein X is $-CH=CH-$ can be converted into compounds containing the grouping wherein X is $-CH_2-CH_2-$ by hydrogenation, for example by catalytic hydrogenation, which may be carried out subsequently.

As a starting material, compounds which contain a benzene radical substituted by the group $R^1R^2N-OC-X$ are used. Of this group, there may be mentioned for example:

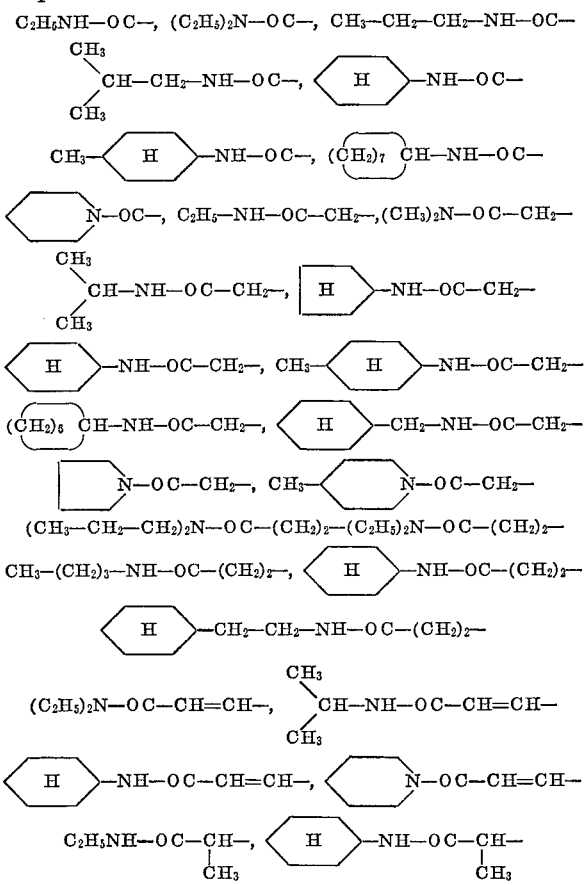

As reactants, the compounds which contain the following radicals as $R^3$ may be used: cyclopentyl, cyclohexyl, 4-methyl-cyclohexyl, 4-ethyl-cyclohexyl, 4-isopropyl-cyclohexyl, cycloheptyl, cyclooctyl, cyclohexyl-methyl, cyclohexyl-ethyl, benzyl, phenylethyl, cyclohexenyl.

The sulfonyl urea derivatives of the present invention are valuable medicaments which are distinguished by a strong and particularly long lasting hypoglycemic action. The hypoglycemic activity can be shown, for example, in rabbits by administering the benzenesulfonyl ureas to these animals in the usual doses of 400 mg./kg. of body weight and determining over a prolonged period the blood sugar value according to the known method by Hagedorn-Jensen.

It has been detected, for example, that the N-[4-(cyclohexyl-carbamylmethyl)-benzenesulfonyl] - N'-cyclohexyl urea causes a maximum lowering of the blood sugar level of 36% after 6 hours, which after 24 hours still amounts to 32%. Upon administration of N-[4-diethyl-carbamyl-methyl)-benzenesulfonyl]-N'-cyclooctyl urea, the blood sugar level is lowered by 32%, and after 24 hours the lowering still amounts to 11%. In the comparative test, however, the N-(4-methyl-benzenesulfonyl) - N' - n-butyl urea, known as an oral antidiabetic and used as a medicament, exhibits a lowering of the blood sugar level by about 40% which after 24 hours is reduced to zero.

The benzenesulfonyl ureas of the present invention are intended to be used preferably for the manufacture of preparations suitable for oral administration and lowering the blood sugar level in the treatment of diabetes mellitus. The urea compounds may be administered as such or in the form of their physiologically tolerable salts or in the presence of substances which cause salt formation. For the formation of salts there may be used, for example, alkaline agents, such, for example, as alkali metal hydroxides, alkaline earth metal hydroxides, alkali metal carbonates and alkaline earth metal carbonates, alkali metal bicarbonates and alkaline earth metal bicarbonates, also organic bases, particularly tertiary nitrogen bases.

As pharmaceutical preparations tablets are preferentially considered. These contain, in addition to the products of the invention, the usual auxiliary adjuvants and carriers, for example talc, starch, lactose, tragacanth or magnesium stearate.

The preparations containing the benzenesulfonyl ureas of the present invention as active substance, are preferably made up in the form of tablets or powders with or without the addition of the aforementioned adjuvants. A dose is to be chosen which is adapted to the activity of the benzenesulfonyl urea used and to the desired effect. It is advantageous to use a dose of about 0.1 to 1 gram of active substance per unit. The dosage units may, however, also be higher or lower; if desired, the units can be divided or multiplied.

The following examples serve to illustrate the invention, but they are not intended to limit it thereto.

EXAMPLE 1

N-[4-(cyclohexylcarbamyl)-benzenesulfonyl]-N'-(4'-methyl-cyclohexyl)-urea 15 grams of N-[4-(cyclohexyl-carbamyl)-benzenesulfonyl]-methyl urethane (melting point 217–218° C.) are suspended in 100 cc. of xylene, and 6.2 grams of 4-methyl-cyclohexyl amine are added thereto at 60° C. The mixture is stirred for 30 minutes and heated for 2 hours at 130° C. whereby methanol escapes. After cooling, the crystalline product is filtered with suction, recrystallized from dimethylformamide/water and washed thoroughly with water and methanol. After drying, the N-[4-(cyclohexyl-carbamyl) - benzenesulfonyl]-N'-(4'-methylcyclohexyl)-urea melts at 250° C. with decomposition.

In an analogous manner there are obtained:

N - [4-(cyclohexyl-carbamyl)-benzenesulfonyl]-N'-cyclooctyl-urea, melting point 224° C. (decomposition) from N - [4 - (cyclohexyl - carbamyl)-benzenesulfonyl]-methylurethane and cyclooctyl amine;

N - [4 - cyclohexyl-carbamyl)-benzenesulfonyl]-N'-cyclohexyl-urea, melting point 238–239° C. from N-[4-cyclohexyl-carbamyl)-benzenesulfonyl]-methylurethane and cyclohexyl amine; and N - [4 - (cyclohexyl-carbamyl)-benzenesulfonyl]-N-cyclohexyl-methyl)-urea, melting point 241–244° C. from N - [4 - (cyclohexyl-carbamyl)-benzenesulfonyl]-methylurethane and cyclohexyl-methyl amine.

EXAMPLE 2

N-[4-(diethylcarbamyl)-benzenesulfonyl]-N'-cyclooctyl-urea 25.6 grams of 4-diethylcarbamyl-benzenesulfonamide (melting point 183–184° C.) are dissolved in 50 cc. of 2 N sodium hydroxide solution and 100 cc. of acetone and 15.3 grams of cyclooctyl isocyanate are added dropwise thereto at 0 to 5° C. The mixture is stirred for 2 hours, double the quantity of water is added, the solution is filtered through charcoal and the filtrate is acidified by means of dilute hydrochloric acid. The precipitating oil solidifies. After recrystallization from methanol the N-[4 - (diethylcarbamyl) - benzenesulfonyl] - N'-cyclooctylurea melts at 144 to 145° C. The yield is 76%.

In an analogous manner there are obtained:

N-[4-(diethylcarbamyl)-benzenesulfonyl]-N'-(4'-methyl-cyclohexyl)-urea, melting point 163–164° C. (from methanol) from 4-diethylcarbamyl-benzenesulfonamide and 4-methyl-cyclohexyl isocyanate;

N - [4-(diethylcarbamyl-methyl)-benzenesulfonyl]-N'-cyclohexyl urea, melting point 194–195° C. (from methanol) from 4-diethylcarbamyl-methyl)-benzenesulfonamide (melting point 175–176° C.) and cyclohexyl isocyanate;

N - [4-(diethylcarbamyl-methyl)-benzenesulfonyl]-N'-(4'-methyl-cyclohexyl)-urea, melting point 182–183° C. (from methanol) from 4-(diethylcarbamyl-methyl)-benzene-sulfonamide and 4-methylcyclohexyl isocyanate;

N - [4-(diethylcarbamyl-methyl)-benzenesulfonyl]-N'-cyclooctyl-urea, melting point 179–180° C. (from methanol) from 4-(diethylcarbamyl-methyl)-benzenesulfonamide and cyclooctyl isocyanate;

N - [4 - (propylcarbamyl - methyl) - benzenesulfonyl]-N' - cyclohexyl urea melting point 180–180.5° C. (from methanol) from 4 - (propylcarbamyl-methyl) - benzenesulfonamide (melting point 175–176.5° C.) and cyclohexyl isocyanate;

N - [4 - (propylcarbamyl-methyl) - benzenesulfonyl]-N' - (4' - methylcyclohexyl) - urea, melting point 193–194° C. (from methanol) from 4 - (propylcarbamyl-methyl) - benzenesulfonamide and 4-methylcyclohexyl isocyanate;

N - [4 - (propylcarbamyl-methyl) - benzenesulfonyl]-N' - cyclooctyl urea, melting point 170.5–171.5° C. (from methanol) from 4 - (propylcarbamyl-methyl) - benzenesulfonamide and cyclooctylisocyanate;

N - [4 - (3' - methylpentamethylene-carbamyl-methyl)-benzenesulfonyl] - N' - cyclohexyl urea, melting point 149–151° C. (from methanol) from 4 - (3' - methylpentamethylene - carbamyl-methyl) - benzenesulfonamide (melting point 164–165.5° C.) and cyclohexyl isocyanate;

N - [4 - (3' - methylpentamethylene-carbamyl-methyl)-benzenesulfonyl] - N' - methylcyclohexyl) - urea, melting point 161.5–163.5° C. (from methanol) from 4-(3'-methylpentamethylene-carbamyl-methyl) - benzene sulfonamide and 4-methylcyclohexyl isocyanate;

N - [4 - (3' - methylpentamethylene-carbamyl-methyl)-benzenesulfonyl] - N' - cyclooctyl - urea, melting point 143–144° C. (from acetone) from 4 - (3' - methylpentamethylene - carbamyl - methyl) - benzenesulfonamide and cyclooctyl isocyanate;

N - [4 - (pentamethylene-carbamyl)-benzenesulfonyl]-N' - (4' - methylcyclohexyl) - urea, melting point 194–195° C. (from methanol) from 4 - (pentamethylene-carbamyl) - benzenesulfonamide (melting point 205–206° C.) and 4-methylcyclohexyl-cyanate;

N - [4 - (pentamethylene-carbamyl)-benzenesulfonyl]-N' - cyclooctyl-urea, melting point 156–157° C. (from methanol) from 4 - (pentamethylene-carbamyl)-benzenesulfonamide and cyclooctylisocyanate;

N - [4 - (3' - methylpentamethylene-carbamyl) - benzenesulfonyl] - N' - (4' - methylcyclohexyl) - urea, melting point 182–184° C. (from methanol) from 4-(3'-methylpentamethylene - carbamyl) - benzenesulfonamide (melting point 209–211° C.) and 4 - methylcyclohexyl isocyanate;

N - [4 - (3' - methylpentamethylene-carbamyl)-benzenesulfonyl] - N' - cyclooctyl-urea, melting point 176–177° C. (from methanol) from 4 - (3' - methylpentamethylene-carbamyl)-benzenesulfonamide and cyclooctyl isocyanate;

N - [4 - (3' - methylpentamethylene-carbamyl) - benzenesulfonyl] - N' - cyclohexyl-urea, melting point 176.5–177.5° C. (from methanol) from 4 - (3' - methylpentamethylene-carbamyl) - benzenesulfonamide and cyclohexyl isocyanate.

EXAMPLE 3

N-[4-(cyclohexylcarbamyl-methyl)-benzenesulfonyl]-N'-(cyclohexylmethyl)-urea 12.7 grams of N-[4-(cyclohexyl-carbamylmethyl)-benzenesulfonyl]-urea (melting point 203–204° C.) are suspended with 4.7 grams of cyclohexyl-methylamine and 2.5 grams of glacial acetic acid in 250 cc. of toluene and heated for 4 hours under reflux while stirring. After cooling, the precipitated product is filtered with suction, washed with water and recrystallized from dimethylformamide/water. The N - [4 - (cyclohexylcarbamylmethyl)-benzenesulfonyl] - N' - (cyclohexyl-methyl)-urea, obtained in a yield of 85%, melts at 213.5° C.

In an analogous manner there are obtained:

N - [4-(cyclohexylcarbamyl-methyl)-benzenesulfonyl]-N' - cyclohexyl urea, melting point 208.5–209.5° C. (from methanol) from N - [4 - (cyclohexylcarbamylmethyl)-benzenesulfonyl]-urea and cyclohexyl amine;

N - [4-(cyclohexylcarbamyl-methyl)-benzenesulfonyl]-N' - (4' - methyl-cyclohexyl) - urea, melting point 198.5–199° C. (from methanol) from N - [4 - (cyclohexylcarbamyl-methyl) - benzenesulfonyl] - urea and 4-methylcyclohexyl amine;

N - [4-(cyclohexylcarbamyl-methyl)-benzenesulfonyl]-N' - cyclooctyl-urea, melting point 197.5–199° C. (from methanol) from N - [4 - cyclohexylcarbamyl-methyl)-benzenesulfonyl]-urea and cyclooctyl amine.

EXAMPLE 4

N-[4-(cyclohexylcarbamyl-methyl)-benzenesulfonyl]-N'-cyclohexyl urea 3.82 grams of N - [4 - (cyclohexylcarbamyl-methyl)-benzenesulfonyl]-N'-acetyl urea (melting point 177° C. with decomposition) and 15.9 grams of cyclohexylamine acetate are thoroughly mixed and heated for 2 hours to 140–150° C. in an open flask. The clear melt is dissolved in sodium hydroxide solution of 1% strength, filtered, and the filtrate is acidified. The so obtained N-[4 - (cyclohexylcarbamyl-methyl) - benzenesulfonyl]-N'-cyclohexyl urea is recrystallized twice from methanol and melts at 208–209° C.

EXAMPLE 5

N-[4-(pentamethylenecarbamyl-methyl)-benzenesulfonyl]-N'-(4'-methylcyclohexyl)-urea 15.4 grams of N,N - diphenyl - N' - (4 - methylcyclohexyl)-urea, 7.61 grams of sodium 4-(pentamethylene-carbamyl-methyl)-benzenesulfonamide are heated for 7 hours at 100° C. on the oil bath in 50 cc. of dimethylformamide. After cooling, water is added, the solution is rendered alkaline by means of dilute sodium hydroxide solution and extracted with ether. The aqueous phase is filtered by adding charcoal, and the filtrate is acidified.

The so obtained N - [4 - (pentamethylenecarbamyl-methylenecarbamyl-methyl) - benzenesulfonyl] - N' - (4'-methylcyclohexyl)-urea melts at 144–145° C. after recrystallization from methanol.

EXAMPLE 6
N-[4-(pentamethylene-carbamyl-methyl)-benzenesulfonyl]-N'-cyclooctyl-urea 15.2 grams of sodium 4 - (pentamethylenecarbamyl-methyl) - benzenesulfonamide are thoroughly mixed with 7 grams of ground potassium carbonate and 18.5 grams of cyclooctyl-carbamic acid methyl ester (melting point 65–66° C.) and heated for 3 hours at 130° C. on the oil bath. After cooling, water is added to the mixture, the excess carbamic acid ester is removed by extraction with ether, the aqueous phase is acidified and the precipitate is filtered with suction. The obtained N-[4-(pentamethylenecarbamyl-methyl) - benzenesulfonyl]-N'-cyclooctyl-urea is recrystallized twice from methanol and melts at 167.5–168.5° C.

In an analogous manner there are obtained:

N - [4 - (pentamethylenecarbamyl - methyl)-benzenesulfonyl]-N'-cyclohexyl urea, melting point 170–171° C. (from methanol) from sodium 4-(pentamethylenecarbamyl-methyl) - benzenesulfonamide and cyclohexyl carbamic acid methyl ester.

EXAMPLE 7
N-[4-(cyclohexylcarbamyl - methyl) - benzenesulfonyl]-N'-cyclohexyl urea 13.6 grams of mercury chloride (0.05 mol) are dissolved in 120 cc. of water. While stirring, 50 cc. of 2 N-sodium hydroxide solution are added dropwise. To the precipitated mercury oxide there are added 17.5 grams (0.04 mol) of N-[4-(cyclohexylcarbamyl-methyl)-benzenesulfonyl]-N'-cyclohexylthiourea (melting point 141–143° C., prepared from 4-(cyclohexylcarbamyl-methyl)-benzenesulfonamide and cyclohexyl mustard oil, dissolved in 80 cc. of 1 N-sodium hydroxide solution, at a temperature of 40° C. Stirring is continued for 2–3 hours, the mercury sulfide is filtered with suction, and the residue is washed with a slight amount of water. The filtrate is clarified with charcoal and acidified. The N[4-(cyclohexylcarbamyl-methyl)-benzenesulfonyl] - N' - cyclhexyl urea, obtained in the form of crystals, is recrystallized from methanol and melts at 208.5–209.5° C.

EXAMPLE 8
N-[4 - (cyclohexylcarbamyl - methyl)-benzenesulfonyl]-N'-cyclohexyl urea 28.5 grams of cyclohexyl urea are reacted with 19 cc. of dimethyl sulfate by heating on the steam bath. After 30 minutes the clear solution is cooled and dissolved in 100 cc. of water. While stirring, a solution of 58 grams of 4-(cyclohexylcarbamyl-methyl) - benzenesulfochloride in 120 cc. of acetone and a solution of 18 grams of sodium hydroxide in 100 cc. of water are simultaneously added drop by drop in such a way that the temperature does not exceed 40° C., and the mixture remains alkaline. Stirring is continued for an hour, the mixture is then cooled, and the precipitate is filtered with suction. The N-[4-(cyclohexylcarbamyl-methyl) - benzenesulfonyl] - N'-cyclohexyl-isourea methyl ether melts at 113–115° C., after being recrystallized twice from benzene/petroleum ether.

8.72 grams of the afore-mentioned compound are heated for 10 minutes on the steam bath with 50 cc. of concentrated hydrochloric acid. Water is added to the smeary product. After a short time crystals are obtained which are filtered with suction and washed thoroughly with water. The N-[4-(cyclohexylcarbamyl-methyl)-benzenesulfonyl]-N'-cyclohexyl urea is recrystallized from dimethylformamide/methanol and melts at 208–210° C.

EXAMPLE 9
N-[4 - (cyclohexylcarbamyl - methyl)-benzenesulfonyl]-N'-cyclohexyl urea 14.8 grams of 4-[cyclohexylcarbamyl-methyl]-benzenesulfonamide, 20 grams of ground potassium carbonate and 100 cc. of acetone are stirred for 1 hour at 55° C. 8.5 grams of cyclohexyl carbamic acid chloride are then added drop by drop within 30 minutes, and stirring is continued for 10 hours at about 55° C. The acetone is distilled off in vacuo, and the residue is dissolved by heating in a large quantity of water. The solution is filtered, and the filtrate is acidified by means of hydrochloric acid. The precipitating N-[4 - (cyclohexylcarbamyl - methyl)-benzenesulfonyl]-N'-cyclohexyl urea is filtered with suction and recrystallized from methanol. Melting point 208–209° C.

EXAMPLE 10
N-[4 - (cyclohexylcarbamyl - methyl)-benzenesulfonyl]-N'-cyclohexyl urea 19.6 grams of cyclohexyl parabanic acid are suspended in 250 cc. of benzene, and 10 grams of triethylamine are added thereto, whereby solution sets in. 31.6 grams of 4-(cyclohexylcarbamyl-methyl) - benzenesulfochloride are then dissolved in 250 cc. of benzene, and the two solutions are poured together and heated while boiling for 3½ hours. The precipitated triethylamine hydrochloride is filtered with suction, and the filtrate is concentrated in vacuo. The viscous residue is crystallized by the addition of petroleum ether. The obtained 1-cyclohexyl-3-[4-(cyclohexylcarbamyl - methyl)-benzenesulfonyl] - parabanic acid melts with foaming at 225–226° C. The yield is 74%.

The product is heated for 5 minutes on the steam bath with 1 N-sodium hydroxide solution. After acidification by means of dilute hydrochloric acid, there is obtained the N-[4 - (cyclohexylcarbamyl - methyl)-benzenesulfonyl]-N'-cyclohexyl urea in a yield of 93%. The compound melts at 208–210° C.

EXAMPLE 11
N - [4-($\beta$ - diethylcarbamyl-vinyl)-benzenesulfonyl]-N'-cyclooctyl urea (a) 28.2 grams of 4($\beta$-diethylcarbamyl - vinyl)-benzeneaulfonamide (melting point 183–185° C.) (from methanol) are dissolved in 50 cc. of 2 N-sodium hydroxide solution and 100 cc. of acetone, and 15.3 grams of clooctyl isocyanate are added dropwise thereto at 0–5° C. The mixture is stirred for 3 hours, diluted with water until the reaction mixture is dissolved. It is then filtered through charcoal, and the filtrate is acidified by means of dilute hydrochloric acid. The N-[4-($\beta$-diethylcarbamyl-vinyl)-benzenesulfonyl]-N'-cyclooctyl urea, obtained in a crystalline form, is recrystallized from methanol with the addition of a slight amount of dimethylformamide it melts at 186–188° C.

(b) 16 grams of the afore-mentioned compound are suspended in 100 cc. of dimethylfmormamide and 200 cc. of methanol and hydrogenated by means of palladium at room temperature and under normal pressure. After 1 hour the theoretical quantity of hydrogen is taken up. The catalyst is filtered with suction, and the filtrate is mixed with water until it becomes turbid. In the refrigerator the N - [4-($\beta$ - diethylcarbamyl-ethyl)-benzenesulfonyl]-N'-cyclooctyl urea crystallizes out in nearly quantitative yield in the course of several hours. After filtering with suction and drying, the obtained product melts at 146–147° C.

In an analogous manner there are obtained:

N - [4 - ($\beta$-diethylcarbamyl-vinyl)-benzenesulfonyl]-N'-cyclohexyl-urea, melting point 185–186.5° C. (from methanol), prepared from 4-($\beta$-diethylcarbamyl-vinyl)-benzenesulfonamide and cyclohexyl isocyanate, and from this the N-[4-(-diethylcarbamyl-ethyl)-benzenesulfonyl]-N'-cyclohexyl urea, melting point 113–114° C.;

N - [4 - (β - diethylcarbamyl - vinyl) - benzenesulfonyl]-N'-(4'-methylcyclohexyl)-urea, melting point 189–191° C. (from methanol) prepared from 4-(β-diethylcarbamyl-vinyl)-benzenesulfonamide and 4 - methyl - cyclohexylisocyanate, and from this the N-[4-(β-diethylcarbamyl - ethyl) - benzenesulfonyl] - N' - (4' - methylcyclohexyl)-urea, melting point 133–134° C.;

N - [4 - (β - cyclohexylcarbamyl - vinyl) - benzenesulfonyl]-N'-cyclooctyl urea, melting point 222.5–224.5° C. (from dimethylformamide/water), prepared from 4-(β-cyclohexylcarbamyl-vinyl)-benzenesulfonamide (melting point 261–262° C. from dimethylformamide/water) and cyclooctylisocyanate, and from this the N-[4-(β-cyclohexylcarbamyl - ethyl) - benzenesulfonyl] - N' - cyclooctyl-urea, melting point 181–183° C. (from methanol);

N - [4 - (β - cyclohexylcarbamyl - vinyl) - benzenesulfonyl]-N'-cyclohexyl urea, melting point 235° C. (with decomposition), (from dimethylformamide/water), prepared from 4-(β-cyclohexylcarbamyl-vinyl)-benzenesulfonamide and cyclohexyl isocyanate and from this the N - [4 - (β - cyclohexylcarbamyl - ethyl) - benzenesulfonyl]-N'-cyclohexyl urea, melting point 192.5–194° C. (from methanol);

N - [4 - (β - cyclohexylcarbamyl - vinyl) - benzenesulfonyl]-N'-(4'-methyl-cyclohexyl)-urea, melting point 235–236° C. (with decomposition), (from dimethylformamide/water), prepared from 4-(β-cyclohexylcarbamyl-vinyl)-benzenesulfonamide and 4-methylcyclohexyl isocyanate, and from this the N-[4-(β-cyclohexylcarbamyl-ethyl) - benzenesulfonyl] - N' - (4' - methylcyclohexyl)-urea, melting point 192–193.5° C. (from methanol).

EXAMPLE 12

N-(4-cyclohexylcarbamyl-methyl-benzenesulfonyl)-N'-(4-isopropyl-cyclohexyl)-urea 15 grams of 4-(cyclohexylcarbamyl-methyl)-benzenesulfonamide are admixed in 100 cc. of acetone with a solution of 2 grams of sodium hydroxide in 150 cc. of water. While stirring, 9 grams of 4-isopropyl-cyclohexyl isocyanate are added dropwise to the clear solution at about 20° C., and stirring is continued for 2 hours. A thick precipitate is slowly formed. Water and hydrochloric acid are added, the product is filtered with suction and recrystallized from ethanol/dimethylformamide. The N-(4-cyclohexylcarbamyl-methyl-benzenesulfonyl) - N' - (4-isopropyl-cyclohexyl)-urea melts at 247–250° C.

EXAMPLE 13

N-[4-(cyclohexylcarbamyl)-benzenesulfonyl]-N'-cycloheptyl urea 10 grams of 4-(cyclohexylcarbamyl)-benzenesulfonyl urea are suspended together with 3.7 grams of cycloheptylamine and 2 grams of glacial acetic acid in 200 cc. of toluene and heated under reflux for 4 hours. The solution is cooled, and the precipitate is filtered with suction. By dissolving and reprecipitating the filtrate twice from dimethylformamide/water a decomposition point of 256–260° C. was found.

N - [4 - cyclohexylcarbamyl) - benzenesulfonyl] - N'-benzyl urea, decomposition point 232° C. (from dimethylformamide/water) is prepared in an analogous manner.

We claim:

1. A process for lowering of blood sugar in an animal which comprises orally administering to said animal an effective amount of a compound selected from the group consisting of a benzenesulfonyl urea of the formula:

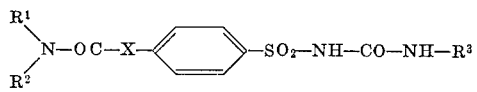

in which

R¹ is a member selected from the group consisting of alkyl of 1 to 4 carbon atoms, cycloalkyl of up to 8 carbon atoms, alkyl substituted cycloalkyl of up to 8 carbon atoms, cyclohexyl methyl and cyclohexyl ethyl, R² is a member selected from the group consisting of hydrogen and alkyl of 1 to 4 carbon atoms, R¹ and R² together with the nitrogen atom linked thereto form a member selected from the group consisting of unsubstituted and methyl substituted heterocyclic nuclei of 4 to 6 carbon atoms in the heterocyclic ring, X is a saturated hydrocarbon bridge of 1 to 2 carbon atoms or a vinyl bridge of 2 carbon atoms, R³ is a member selected from the group consisting of lower alkyl substituted cycloalkyl of 5 to 8 ring carbon atoms, cyclohexylmethyl, cyclohexylethyl and phenyl alkyl of 1 to 2 alkyl carbon atoms, and pharmaceutical acceptable basic salts thereof.

2. A composition in the form of a tablet suitable for oral administration and lowering of blood sugar in a host containing from 0.1 to 1 gram of a compound as claimed in claim 1 and a carrier thereof.

References Cited

UNITED STATES PATENTS

| | | | |
|---|---|---|---|
| 2,964,560 | 12/1960 | Haack et al. | 260—553 |
| 3,198,706 | 8/1965 | Ruschig et al. | 167—65 |
| 3,336,322 | 8/1967 | Weber et al. | 167—65 |

ALBERT T. MEYERS, Primary Examiner.

J. GOLDBERG, Assistant Examiner.

U.S. Cl. X.R.

424—321, 244, 274